US012731015B2

(12) United States Patent
Dalgaty

(10) Patent No.: US 12,731,015 B2
(45) Date of Patent: Sep. 8, 2026

(54) SYNAPSE CIRCUIT FOR VARIATIONAL INFERENCE

(71) Applicant: Commissariat à l'Energie Atomique et aux Energies Alternatives, Paris (FR)

(72) Inventor: Thomas Dalgaty, Gif-sur-Yvette (FR)

(73) Assignee: Commissariat à I'Energie Atomique et aux Energies Alternatives, Paris (FR)

( * ) Notice: Subject to any disclaimer, the term of this patent is extended or adjusted under 35 U.S.C. 154(b) by 920 days.

(21) Appl. No.: 18/046,926

(22) Filed: Oct. 16, 2022

(65) Prior Publication Data

US 2023/0125074 A1 Apr. 27, 2023

(30) Foreign Application Priority Data

Oct. 26, 2021 (EP) .................................... 21306485

(51) Int. Cl.
*G06N 3/063* (2023.01)
*G06N 7/01* (2023.01)

(52) U.S. Cl.
CPC ............... *G06N 3/063* (2013.01); *G06N 7/01* (2023.01)

(58) Field of Classification Search
CPC ................................. G06N 3/063; G06N 7/01
USPC ..................................................... 365/185.33
See application file for complete search history.

(56) References Cited

U.S. PATENT DOCUMENTS 11,593,624 B2 * 2/2023 Fantini .................. G06N 3/049
2022/0198247 A1 * 6/2022 Ma ........................ G06N 3/065

OTHER PUBLICATIONS

Dalgaty, Thomas, et al. "Ex Situ Transfer of Bayesian Neural Networks to Resistive Memory-Based Inference Hardware". Advanced Intelligent Systems. May 20, 2021. Accessed at https://advanced.onlinelibrary.wiley.com/doi/full/10.1002/aisy.202000103. (Year: 2021).*
European Search Report for European Application No. 21306485 dated Apr. 13, 2022, 2 pages.
Dalgaty, Thomas, et al. "Ex Situ Transfer of Bayesian Neural Networks to Resistive Memory-Based Inference Hardware." Advanced Intelligent Systems 3.8 (2021): 2000103. (9 pages).
Lin, Yudeng, et al. "Bayesian neural network realization by exploiting inherent stochastic characteristics of analog rram." 2019 IEEE International Electron Devices Meeting (IEDM). IEEE, 2019. (4 pages).

(Continued)

*Primary Examiner* — Amir Zarabian
*Assistant Examiner* — Daniel John King
(74) *Attorney, Agent, or Firm* — Jordan IP Law, LLC

(57) ABSTRACT

The present disclosure relates to a synapse circuit (202) for a Bayesian neural network, the synapse circuit comprising: a first resistive memory device (302) coupling a first voltage rail ($V_{read}$) to a first terminal of a capacitor (308), the first terminal of the capacitor (308) being coupled to a second voltage rail via a variable conductance (306); and a second resistive memory device (304) coupling a second voltage rail ($V_{data}$) to an output line (312) of the synapse circuit (202), wherein a second terminal of the capacitor (306) is coupled to a terminal of the second resistive memory device (304).

13 Claims, 6 Drawing Sheets

(56) References Cited

OTHER PUBLICATIONS

Dalgaty, Thomas, et al. "In situ learning using intrinsic memristor variability via Markov chain Monte Carlo sampling." Nature Electronics 4.2 (2021): 151-161.
Dutta, Sourav, et al. "Neural sampling machine with stochastic synapse allows brain-like learning and inference." Nature Communications 13.1 (2022): 1-10.
Faria, Rafatul, Kerem Y. Camsari, and Supriyo Datta. "Implementing Bayesian networks with embedded stochastic MRAM." AIP Advances 8.4 (2018): 045101.
Mizrahi, Alice, et al. "Neural-like computing with populations of superparamagnetic basis functions." Nature communications 9.1 (2018): 1-11.

* cited by examiner

SYNAPSE CIRCUIT FOR VARIATIONAL INFERENCE

FIELD

The present disclosure relates generally to the field of artificial neural networks, and in particular to devices and methods for implementing Bayesian neural networks.

BACKGROUND

Artificial neural networks (ANN) are computing architectures that are developed to mimic, to a certain extent, neuro-biological systems. Such neural networks generally comprise a network of artificial neurons, which receive inputs, combine these inputs with their internal state, and often apply a function to it, in order to produce an output signal. Outputs of neurons are coupled to the inputs of other neurons by connections, which are referred to as synapses, their equivalent in the biological brain.

The synapses generally perform some processing of the signals conveyed between the neurons. For example, each synapse stores a gain factor, or weight, which is applied to the signal from the source neuron in order to increase or decrease its strength, before it is conveyed to one or more post-synaptic neurons. The synapses between each layer of neurons of the ANN are generally implemented by a matrix multiplication or dot/inner product calculation.

It is possible to categorize neural networks into two families: deterministic neural networks, which provide a deterministic output for a given input; and Bayesian, or probabilistic neural networks, which are based on Bayesian deep learning models, and which encode synaptic parameters using distributions of probability.

Bayesian deep learning models are of great interest because, since they describe parameters using probability distributions, the probability distributions of their outputs can be used to describe uncertainty in predictions. Uncertainty can be particularly useful in safety-critical applications, such as autonomous driving, where potentially dangerous actions, based on neural network outputs, should only be taken by a system if these outputs are highly certain. The uncertainty described by Bayesian synapses propagates through to the outputs of the model, thereby offering a means of characterizing the uncertainty in predictions generated by the model.

The publication by Neal, Radford M. entitled "Bayesian learning for neural networks." Vol. 118. Springer Science & Business Media, 2012, describes a Bayesian machine learning scheme based on Markov chain Monte Carlo sampling, which is used to derive the probability distributions for encoding the synaptic weights of the network. However, a drawback of the Markov chain Monte Carlo sampling approach is that the algorithm does not scale well to the large models that are used in the context of deep learning, where there can be millions or hundreds of millions of parameters.

The publication by Blundell, Charles, et al. entitled "Weight uncertainty in neural network" International Conference on Machine Learning. PMLR, 2015, describes an approach based on variational inference, which provides a more promising solution for large models.

In order to provide a hardware implementation of a Bayesian Neural Network based on variational inference, some form of random number generation within the synapses of the network should be used. However, solutions that have been proposed for such random value generation suffer problems in terms of energy efficiency and scalability. Indeed, the random behavior generally relies on the injection of a relatively large DC current into the device, the greater the size of the network, the higher the required current.

SUMMARY

There is a need in the art for a solution for random value generation suitable for Bayesian neural network applications having reduced energy consumption and improved scalability.

It is an aim of embodiments of the present disclosure to at least partially address one or more needs in the prior art.

According to one, aspect, there is provided a synapse circuit for a Bayesian neural network, the synapse circuit comprising: a first resistive memory device coupling a first voltage rail to a first terminal of a capacitor, the first terminal of the capacitor being coupled to a second voltage rail via a variable conductance; and a second resistive memory device coupling a third voltage rail to an first output line of the synapse circuit, wherein a second terminal of the capacitor is coupled to a terminal of the second resistive memory device.

According to one embodiment, the synapse circuit further comprises a selection switch coupled in series with the second resistive memory device.

According to one embodiment, the variable conductance comprises a variable resistor.

According to one embodiment, the variable conductance is a mirroring branch of a current mirror.

According to one embodiment, the synapse circuit further comprises a current control circuit configured to regulate a biasing current conducted by the variable conductance.

According to one embodiment, the first and second resistive memory devices are each capable of being programmed to have one of a low conductance state and a high conductance state, and the first resistive memory device is programmed to have a low conductance state, and the second resistive memory device is programmed to have a high conductance state.

According to one embodiment, the first and second resistive memory devices are oxide-based resistive random access memory devices.

According to one embodiment, the synapse circuit is a Gaussian mixture synapse, wherein the first and second resistive memory devices, capacitor variable conductance and selection switch form a first sub-circuit, the synapse circuit further comprising:

- at least one further sub-circuit comprising a first further resistive memory device coupling the first voltage rail to a first terminal of a further capacitor, the first terminal of the further capacitor being coupled to the second voltage rail via a further variable conductance; a second further resistive memory device coupling the third voltage rail to an output line of the at least one further sub-circuit, wherein a second terminal of the further capacitor is coupled to a terminal of the second further resistive memory device; and a further selection switch coupled in series with the second further resistive memory device, wherein the first output line and the output line of the at least one further sub-circuit are coupled to a common output line of the Gaussian mixture synapse; and
- a selection circuit configured to control the selection switch of each sub-circuit.

According to one embodiment, the selection circuit comprises a random number generator, and a decoder circuit configured to control the selection switch of each sub-circuit based on a random value generated by the random number generator.

According to a further aspect, there is provided a cross-point memory array for implementing a synaptic weight matrix between layers of a neural network, the cross-point memory array comprising a plurality of the above synapse circuit, one being positioned at each point of the cross-point memory array.

According to a further aspect, there is provided a method of generating a current signal on an output line of a synapse circuit of a Bayesian neural network, the method comprising:

programming a first resistive memory device of the synapse circuit to have a first conductance level, the first resistive memory device coupling a first voltage rail to a first terminal of a capacitor, the first terminal of the capacitor being coupled to a second voltage rail via a variable conductance;

programming a second resistive memory device to have a second conductance level, the second resistive memory device coupling a third voltage rail to the output line of the synapse circuit, wherein a second terminal of the capacitor is coupled to a terminal of the second resistive memory device; and applying a voltage to the first voltage rail in order to generate a current signal on the output line.

According to one embodiment, the method further comprises sampling the current signal to generate the current signal on the output line.

According to one embodiment, the synapse circuit further comprises a selection switch coupled in series with the second resistive memory device, and the method further comprises activating the selection switch while applying the voltage to the first voltage rail in order to generate the current signal on the output line.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, techniques for training an artificial neural network, based for example on minimizing an objective function such as a loss function, are known to those skilled in the art, and will not be described herein in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
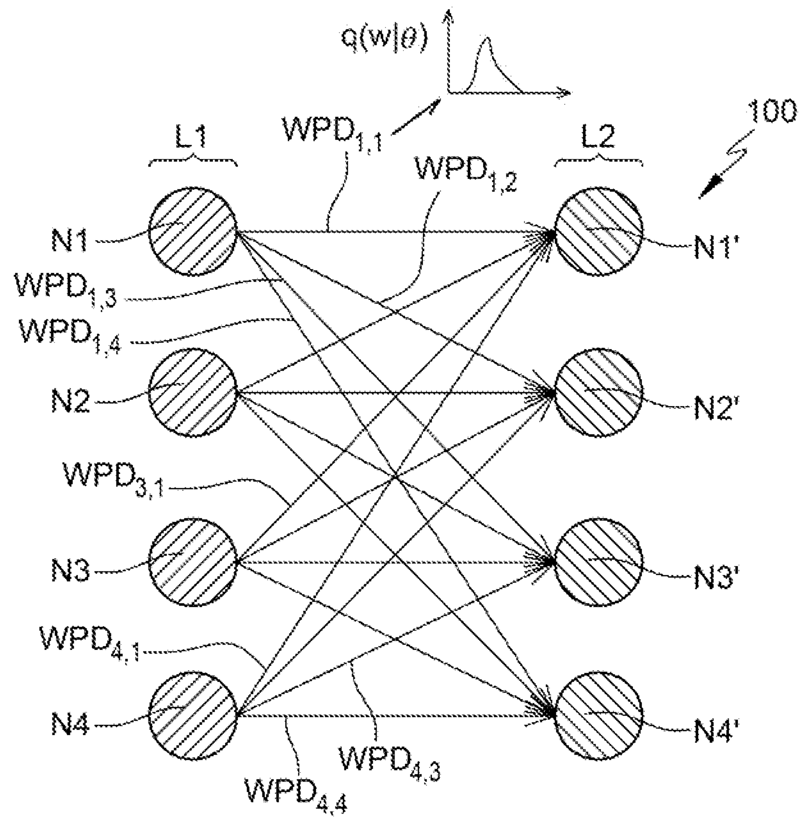
FIG. 1 schematically illustrates a Bayesian neural network according to an example embodiment.

FIG. 1 schematically illustrates a Bayesian neural network 100 according to an example embodiment. The network 100 comprises, in the example of FIG. 1, a layer L1 of source neurons N1 to N4, and a layer L2 of destination neurons N1' to N4', the outputs of each of the neurons N1 to N4 being coupled to inputs of each of the neurons N1' to N4'. In some cases, the layer L1 may be the input layer of the network, and/or the layer L2 may be the output layer of the network. Furthermore, the network 100 may be part of a larger network, and in particular, there may be additional layers before the layer L1 and/or after the layer L2, which may or may not be of Bayesian type.

Each of the source neurons N1 to N4 is coupled to each of the neuros N1' to N4' via a corresponding synapse having an associated weight, which in the case of a Bayesian neural network is not a fixed value, but rather a probability distribution, $WPD_{i,j}$, where i is the index of the source neuron, and j is the index of the destination neuron. An example of the distribution q(w|θ) of $WPD_{1,1}$ as represented by a graph shown as an inset in FIG. 1, where q(w|θ) is the sampling distribution, with parameters θ, used to generate samples of the model, w. Upon each forward propagation through the network, a value of each of the weights $WPD_{i,j}$ is for example sampled based on at least two corresponding probability distribution parameters representing the probability distribution of the synapse, which is for example a Gaussian distribution.

Of course, while FIG. 1 illustrates an example of two layers of a network, each layer comprising four neurons, there could be any number of layers, each with any number of neurons. Furthermore, while in the example of FIG. 1 the layers L1 and L2 are fully connected, in alternative embodiments the layers could be only partially connected.

Figure 2:
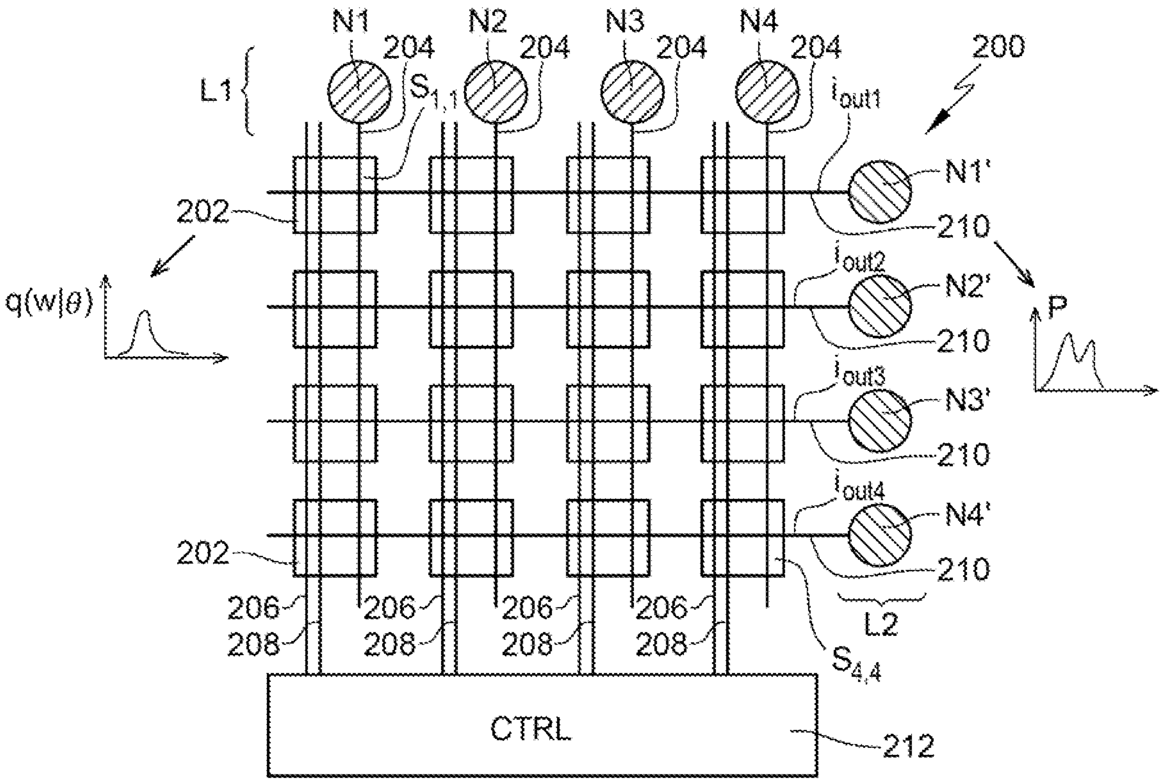
FIG. 2 schematically illustrates a cross-point memory array implementing a synaptic weight matrix between layers of a neural network according to an example embodiment.

FIG. 2 schematically illustrates a cross-point memory array 200 implementing a synaptic weight probability distribution matrix between the layers L1 and L2 of the neural network of FIG. 1. Each synapse $S_{i,j}$ between source neuron i and destination neuron j is implemented by a corresponding synapse circuit 202. There are thus 16 synapse circuits 202 in the example of FIG. 2, one coupling each of the four source neurons N1 to N4 to each of the four destination neurons N1' to N4'. The synapse circuits 202 are for example arranged in columns and rows. Each synapse circuit 202 is for example configured to store, and sample, a probability distribution q(w|θ), as represented by a graph shown as an inset in FIG. 2. The synapse circuits 202 of a same column are for example coupled to a common neuron output line 204 of each column, this line 204 for example being an output line of the source neuron of the synapse circuits 202 of the column. Furthermore, the synapse circuits 202 of a same column are for example coupled to common control lines 206, 208 of each column. The synapse circuits 202 of a same row are for example coupled to a common neuron input line 210 of each row, this line 210 for example being coupled to an input of the destination neuron of the synapse circuits 202 of the row. For example, each synapse circuit 202 of each row generates an output current on the corresponding common neuron input line 210, and the sum of these currents provides an input current $i_{outj}$ to the corresponding destination neuron Nj'. As represented by another graph inset in FIG. 2, the resulting probability distribution present on the common row lines is the sum of the probability distributions of each synapse circuit 202 of the row. The control lines 206, 208 are for example controlled by a control circuit (CTRL) 212.

Figure 3:
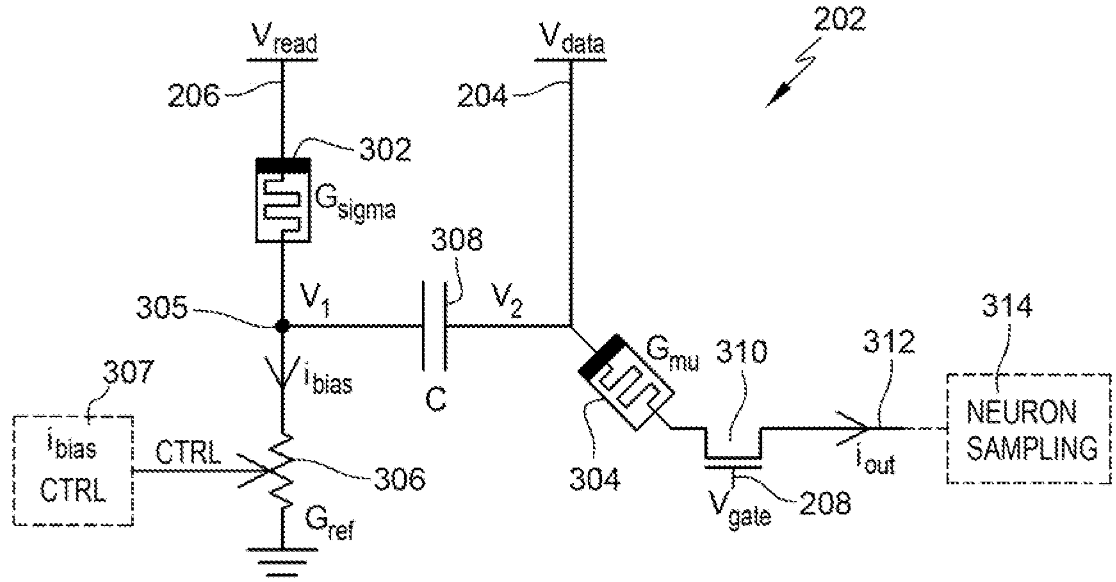
FIG. 3 schematically illustrates a synapse circuit of the memory array of FIG. 2 in more detail according to an example embodiment of the present disclosure.

FIG. 3 schematically illustrates a synapse circuit 202 of the memory array of FIG. 2 in more detail according to an example embodiment of the present disclosure. The synapse circuit 202 is for example suitable for performing variational inference. It would also be possible to use a similar synapse circuit for Markov chain Monte Carlo sampling, with the addition of an external memory for storing all of the samples that have been accepted by the algorithm. For example, in this case, a relatively large number of samples is digitized, for example using an ADC applied to the varying voltage; and then a relatively large number of them are stored with an index that corresponds to "acceptance ratio" of that particular sample, the index being a number that can be calculated that estimates the posterior probability of that particular sample for the entire model given the data and the prior.

The synapse circuit 202 for example comprises two resistive memory devices 302, 304 storing the two probability distribution parameters of the synapse. For example, the device 302 is programmed to have a conductance $G_{sigma}$ representing a standard deviation of the desired probability distribution, and the device 304 is programmed to have a conductance $G_{mu}$ representing a mean of the desired probability distribution.

The resistive memory devices 302, 304 are each for example resistive RAM (RRAM) devices. In the present description, embodiments comprising oxide-based resistive RAM (OxRAM) devices are described, which are based on so-called "filamentary switching". However, other resistive memory technologies could be used, including for example phase change memory (PCM), conductive bridge RRAM, ferromagnetic field effect transistors, FLASH transistors, etc. Such devices are all capable of being programmed, in a non-volatile manner, to have a given conductance level.

As known by those skilled in the art, OxRAM devices have two electrodes separated by an oxide material, one example of which is hafnium dioxide. OxRAM devices are capable of being switched between high and low conductance states that respectively result from the absence or presence of a conductive oxygen vacancy filament within the oxide material. For example, OxRAM devices can be SET to a high conductance state by applying a positive voltage across the device electrodes, the resulting conductance being proportional to the level of the current. OxRAM devices can for example be RESET to the low conductive state by applying a negative voltage over the device electrodes, the resulting conductance being proportional to the magnitude of the RESET voltage.

The resistive memory device 302 is for example coupled in series with a variable conductance 306 between the control line 206 and a reference voltage rail, which is for example a ground voltage rail. The variable conductance 306 for example has a conductance of $G_{ref}$. In some embodiments, the variable conductance 306 is implemented by a variable resistor, such as a polysilicon resistor, or by a pseudo transistor. For example, the variable conductance 306 is controlled in order to conduct a biasing current $i_{bias}$ that is independent of the programmed conductance level of the resistive memory device 302. For example, the variable conductance 306 is controlled by a current control circuit ($i_{bias}$ CTRL) 307, for example implemented in the control circuit 212.

While not illustrated in FIG. 3, the resistive memory device 302 is, for example, coupled in series with a selection transistor that can be used to select the device 302 during programming. For example, the selection transistor could be an n-channel MOS (NMOS) transistor coupling the device 302 to the node 305, or coupling the node 305 to the conductance 306. It would also be possible for the selection transistor to form part of the circuit implementing the variable conductance 306.

The control circuit 212 of FIG. 2 for example applies a voltage $V_{read}$ to the control line 206. A node 305 between the device 302 and the variable conductance 306 is for example coupled to one terminal of a capacitor 308, the other terminal of which is coupled to one terminal of the resistive memory device 304. The capacitor 308 for example provides a function of DC blocking. For example, the capacitor 308 has a capacitance in the range 1 fF to 1 pF. In some embodiment, the capacitor 308 is implemented by a MOSCAP.

The resistive memory device 304 is for example coupled in series with a selection switch 310, implemented for example by an NMOS transistor, between the common neuron output line 204 and an output line 312 of the synapse circuit 202. The selection switch 310 is for example controlled via the control line 208 (see FIG. 2). For example, the control line 208 is coupled to the gate of the transistor implementing the switch 310. The source neuron (not illustrated in FIG. 3) coupled to the synapse circuit 202 for example applies a data signal in the form of a voltage $V_{data}$ to the common neuron output line 204. The data signal $V_{data}$ is for example an analog voltage level generated by the source neuron. Alternatively, the data signal $V_{data}$ could be a binary voltage, if for example the cross-point is part of a spiking neural network. The control circuit 212 for example applies a voltage $V_{gate}$ to the control line 208.

The output current $i_{out}$ of the synapse circuit 202 is for example provided, on the output line 312, which is also the input of the destination neuron. In particular, the output line 312 is coupled to the common neuron input line 210 providing the summed currents, from each synapse circuit of the row, to the destination neuron. The summed currents, including the output current $i_{out}$ of the synapse circuit 202, are for example sampled by an input circuit (NEURON SAMPLING) 314 of the destination neuron.

In operation, the variable conductance 306 and the application of the read voltage $V_{read}$ cause a current to be driven through the resistive memory device 302. Intrinsic Johnson-Nyquist noise (also known as conductance fluctuations), at the programmed conductance level of the device 302, is converted into a voltage at the node 305 using the voltage division between the device 302 and the variable conductance 306. The resistive memory device 302 is for example programmed to be in the low conductance state, implying that it has a relatively high resistance, for example in the mega ohms or giga ohms range, and thus relatively high levels of Intrinsic Johnson-Nyquist noise. For example, the device 302 is programmed to have a resistance of at least 100 k ohms, and for example of at least 1 M ohms. The voltage at the node 305 is thus a noisy Gaussian signal having a DC offset that depends on the values of $G_{sigma}$ and $G_{ref}$. The standard deviation of this noise signal is dependent on the programmed conductance level of the device 302, as given by the following equation:

$$\sigma = \frac{4kT}{G_{sigma}} \quad \text{[Math 1]}$$

where k is the Boltzmann constant, and T is the temperature. An embodiment in which this temperature can be regulated is described below with reference to FIG. 5.

Figure 4A:
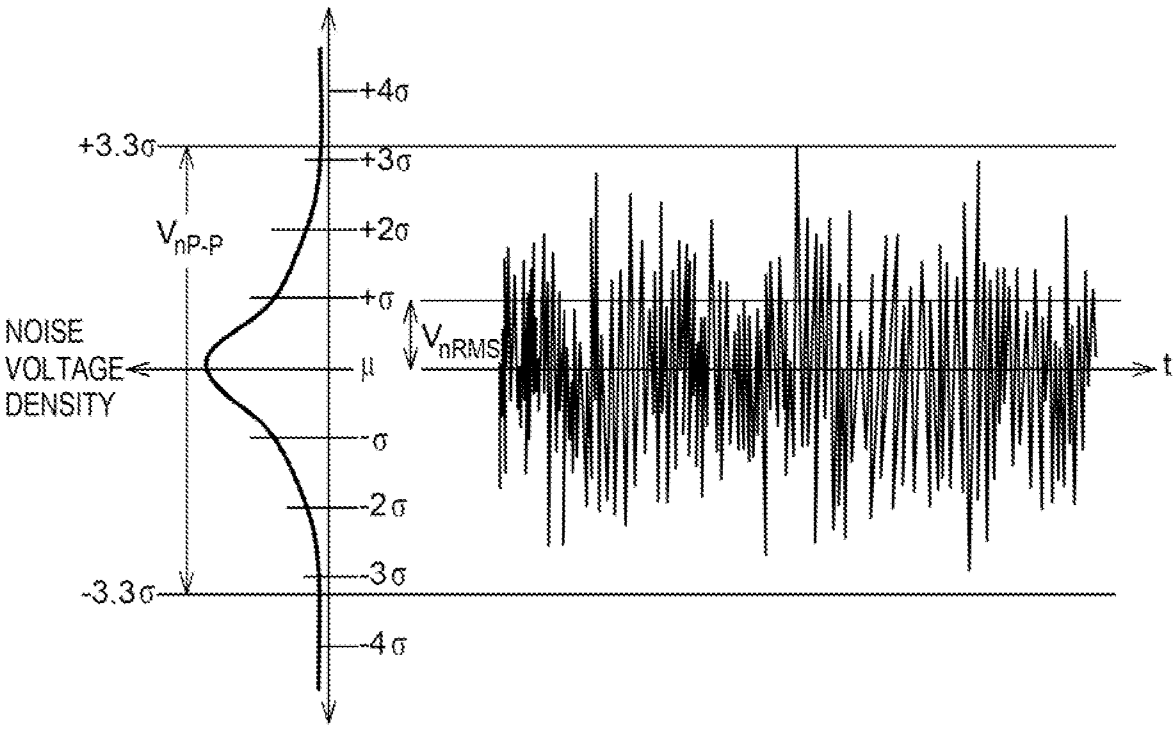
FIG. 4A is a graph illustrating a voltage signal across a noisy resistive memory element of the circuit of FIG. 3, the element being noisy due to thermal/Johnson noise, according to an example embodiment of the present disclosure.

FIG. 4A is a graph illustrating the voltage signal across a noisy resistive memory element 302 of the circuit of FIG. 3. It can be seen from the graph on the left of FIG. 4 that the noise voltage density respects a Gaussian form. It can be seen from the graph on the right of FIG. 4 that the noise signal has a mean $\mu$, an RMS (Root Mean Square) voltage level VnRMS corresponding to one standard deviation $\sigma$ from the mean, and a peak to peak level of $3.3\sigma$.

Figure 4B:
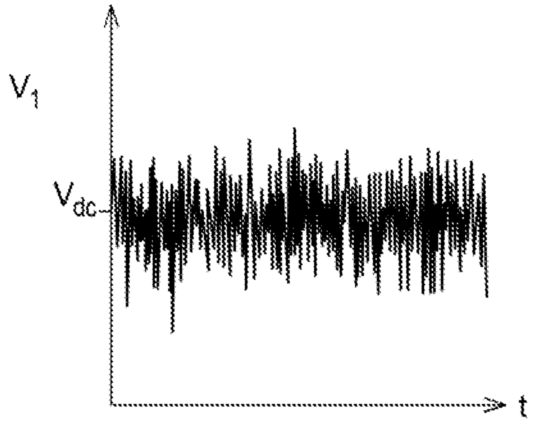
FIG. 4B is a graph illustrating a noise signal with DC offset at a node of the circuit of FIG. 3 according to an example embodiment of the present disclosure.

FIG. 4B is a graph illustrating an example of the voltage $V_1$ at the node 305, corresponding to the Gaussian noise signal of FIG. 4A, added to the DC offset $V_{dc}$ resulting from the voltage division between the device 302 and the variable conductance 306.

With reference again to FIG. 3, the capacitor 308 removes the DC offset of the signal at node 305, and thus injects only the AC noisy Gaussian signal portion at the terminal of the resistive memory device 304.

Figure 4C:
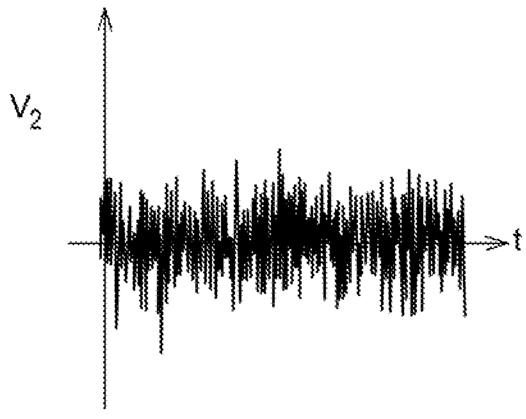
FIG. 4C is a graph illustrating an AC noise signal at a node of the circuit of FIG. 3 according to an example embodiment of the present disclosure.

FIG. 4C is a graph illustrating an example of the voltage signal $V_2$ at the node between capacitor 308 and the device 304, prior to the addition of the data encoding voltage $V_{data}$.

With reference again to FIG. 3, the resistive memory device 304 converts the sum of the voltages $V_{data}$ and $V_2$ into a current signal $i_{out}(t)$ in accordance with Ohms law. The device 304 is for example programmed to be in the high conductance state, and for example has a resistance of less than 20 k ohms, and for example of less than 10 k ohms. The resistance of the device 304 is significantly less than the resistance of the device 302, for example by at least two orders of magnitude, in other words the resistance of the device 304 being at least hundred times less than the resistance of the device 302. Thus, the amount of Intrinsic Johnson-Nyquist noise is relatively low, and can be ignored. Thus, the current signal $i_{out}(t)$ can be expressed as:

$$i_{out}(t) = (V_{data} + V_2(t))G_{mu}$$

This current $i_{out}(t)$ corresponds to a Gaussian distribution centered on $G_{mu}$, with a standard deviation defined by the programmable noise of $G_{sigma}$. This current $i_{out}(t)$ is for example sampled at the input of the destination neuron, as represented by the neuron sampling block 314 in FIG. 3. For example, this may involve the use, in the destination neuron, of a resistor to convert the current into a voltage signal, and a sample and hold circuit to sample and store the voltage. Alternatively, a relatively short voltage pulse is applied as the gate signal $V_{gate}$, and a relatively fast analog to digital converter in the neuron sampling circuit 314 is for example used to capture a digital value of the voltage measured during the voltage pulse. As yet a further example, a relatively short voltage pulse is applied as the gate signal $V_{gate}$, but the current is not converted into a voltage, but rather injected, for example via a current mirror, to a membrane capacitor of an analog neuron circuit. An example of an analog neuron circuit having such a membrane capacitor is described for example in the patent publication entitled "Neuromorphic Architecture" published as EP3855366A1. In all cases, capturing the instantaneous level of the current $i_{out}(t)$ is for example performed relatively quickly, such that the current/voltage fluctuations are not averaged over time. For example, the duration of the sampling operation of the voltage $V_2$ is in the picosecond or nanosecond range, for example less than 10 nanoseconds, and in some cases in the range 1 picosecond to 5 nanoseconds. In some embodiments, a calibration step is used to counteract a sampling time artefact and preserve a relatively large variation in the measured variance. For example, the calibration step involves multiplying the value of a generated by the above equation by a constant between 1 and 0, for example to between 0.9 and 1.

While in the example of FIG. 3 the capacitor 308 is configured to inject the AC noise signal at the input line 204 of the circuit, in alternative embodiments the capacitor 308 could inject the AC noise signal at a different location. For example, rather than being coupled between the node 305 and the line 204, the capacitor 308 could be coupled between the node 305 and the node between the device 304 and the transistor 208, or even between the node 305 and the output line 210. It would also be possible for the switch 310 to instead be coupled between the device 304 and the capacitor/line 204.

Figure 5:
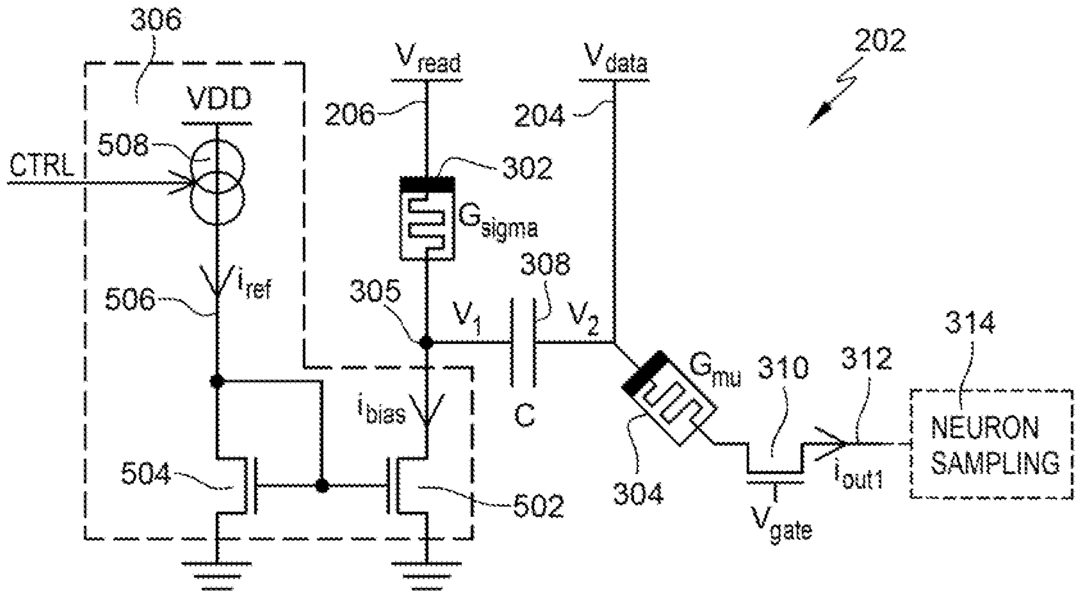
FIG. 5 schematically illustrates a synapse circuit of the memory array of FIG. 2 in more detail according to an alternative embodiment to that of FIG. 3.

FIG. 5 schematically illustrates the synapse circuit 202 of the memory array of FIG. 2 in more detail according to an alternative embodiment to that of FIG. 3. Certain features of the embodiment of FIG. 5 are the same as those of the embodiment of FIG. 3, and these features are labelled with like reference numerals, and will not be described again in detail.

In the embodiment of FIG. 5, the variable conductance 306 is implemented by a mirroring branch of a current mirror. For example, the current mirror comprises a transistor 502 forming the mirroring branch, and a transistor 504 forming a reference branch. The transistor 502 is for example coupled by its main conducting nodes between the node 305 and a reference voltage rail, such as the ground rail. The transistor 504 is for example coupled by its main conducting nodes between a reference current input line 506 and the reference voltage rail. The transistors 502, 504 are for example MOS transistors having their gates coupled together and to the bias current input line 506. A reference current $i_{ref}$ of the current mirror is for example provided on the input line 506, for example by a current source 508. For example, in some embodiments, the current source 508 is selectively activated as a function of the voltage $V_{read}$, such that the current in the current mirror is present only during a read operation. In some embodiments, the current source 508 is variable, such that the reference current $i_{ref}$ can be adjusted based on the programmed resistance of the corresponding device 304. For example, the current source 508 is capable of supplying one of a plurality of different current levels, for example at least four different current levels. This for example allows the magnitude of the noise voltage $V_1$ to be kept relatively close to a desired level, equal for example to around $V_{read}/2$. Based on the programmed resistance level of each device 302, the control circuit 307 is for example configured to generate the control signal CTRL in order to control the current source 508 to supply an appropriate current.

In operation, the current $i_{bias}$ is used to control the gate of the transistor 502 in order to provide a current through the resistive memory device 302 that is independent of the programmed conductance of the device 302.

An advantage of the use of the current mirror in FIG. 5 to generate the biasing current $I_{bias}$ is that temperature can be regulated by the current $I_{ref}$.

Figure 6:
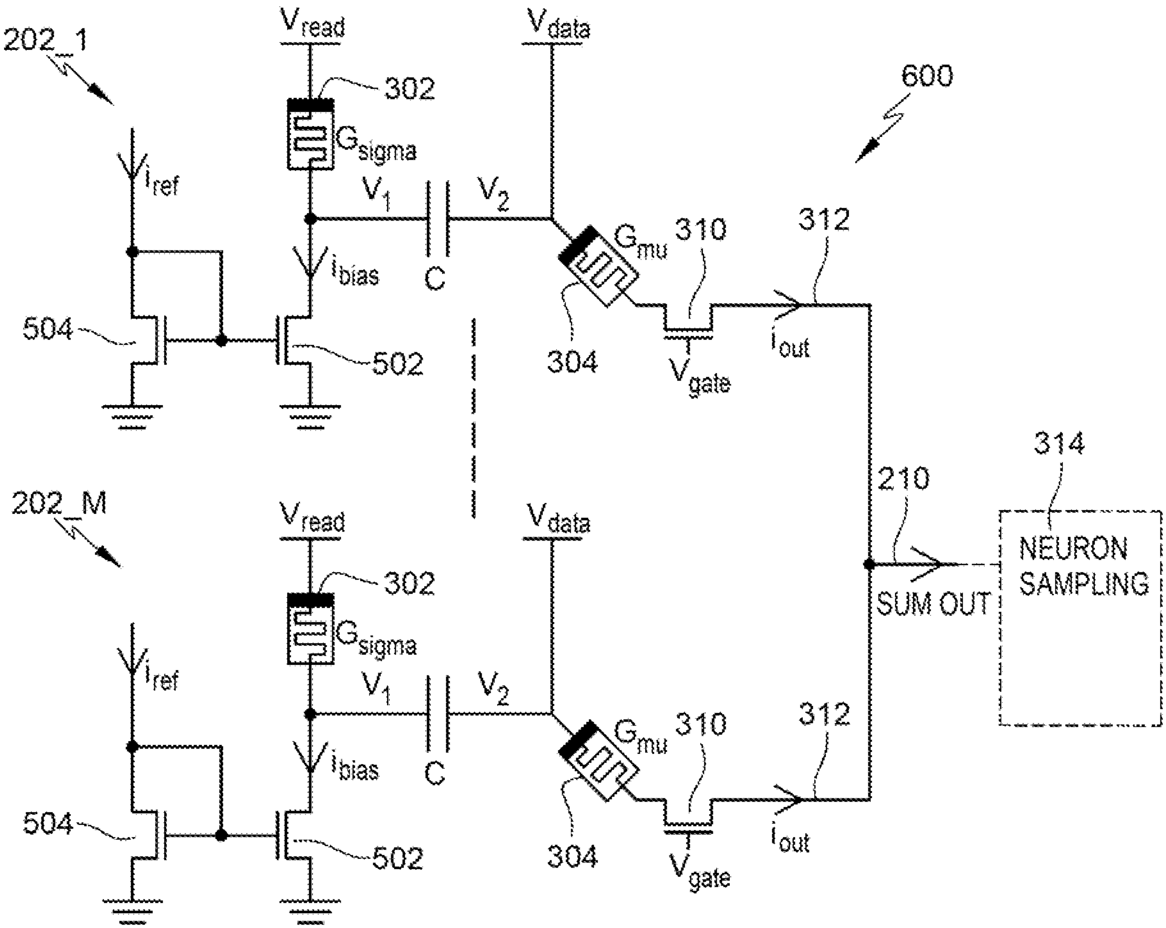
FIG. 6 schematically illustrates a parallel arrangement of a plurality of the synapse circuits of FIG. 5 according to an example embodiment of the present disclosure.

FIG. ¬6 schematically illustrates a parallel arrangement 600 of a plurality M of the synapse circuits of FIG. 5, labelled 202_1 to 202_M. For example, the parallel arrangement 600 corresponds to one row of synapse circuits 202 of the cross-point memory 200 of FIG. 2. As illustrated in FIG. 6, the output lines 312 of the M synapse circuits are coupled together to form the common output line 210 of the row, which conducts a current SUM OUT, and is for example coupled to the sampling circuit (NEURON SAMPLING) 314 of the destination neuron.

The reference current $i_{ref}$ provided to each reference branch 504 of the current mirror of each synapse circuit 202_1 to 202_M is for example a same current level. Thus, while an embodiment is illustrated with a reference branch per synapse circuit 202_1 to 202_M, in alternative embodiments a common reference branch, comprising the transistor 504, could be used to drive the mirroring branch of each synapse circuit. Alternatively, the reference current $i_{ref}$ could be adjusted for each synapse circuit 202_1 to 202_M, as described above in relation with FIG. 5, based on the programmed resistance of the corresponding device 304, such that the magnitude of the noise voltage $V_1$ is kept relatively close to a desired level, equal for example to around $V_{read}/2$.

While the example of FIG. 6 is based on the synapse circuit 202 of FIG. 5, in alternative embodiments the synapse circuits 202_1 to 202_M could be implemented by the embodiment of FIG. 3.

Figure 7:
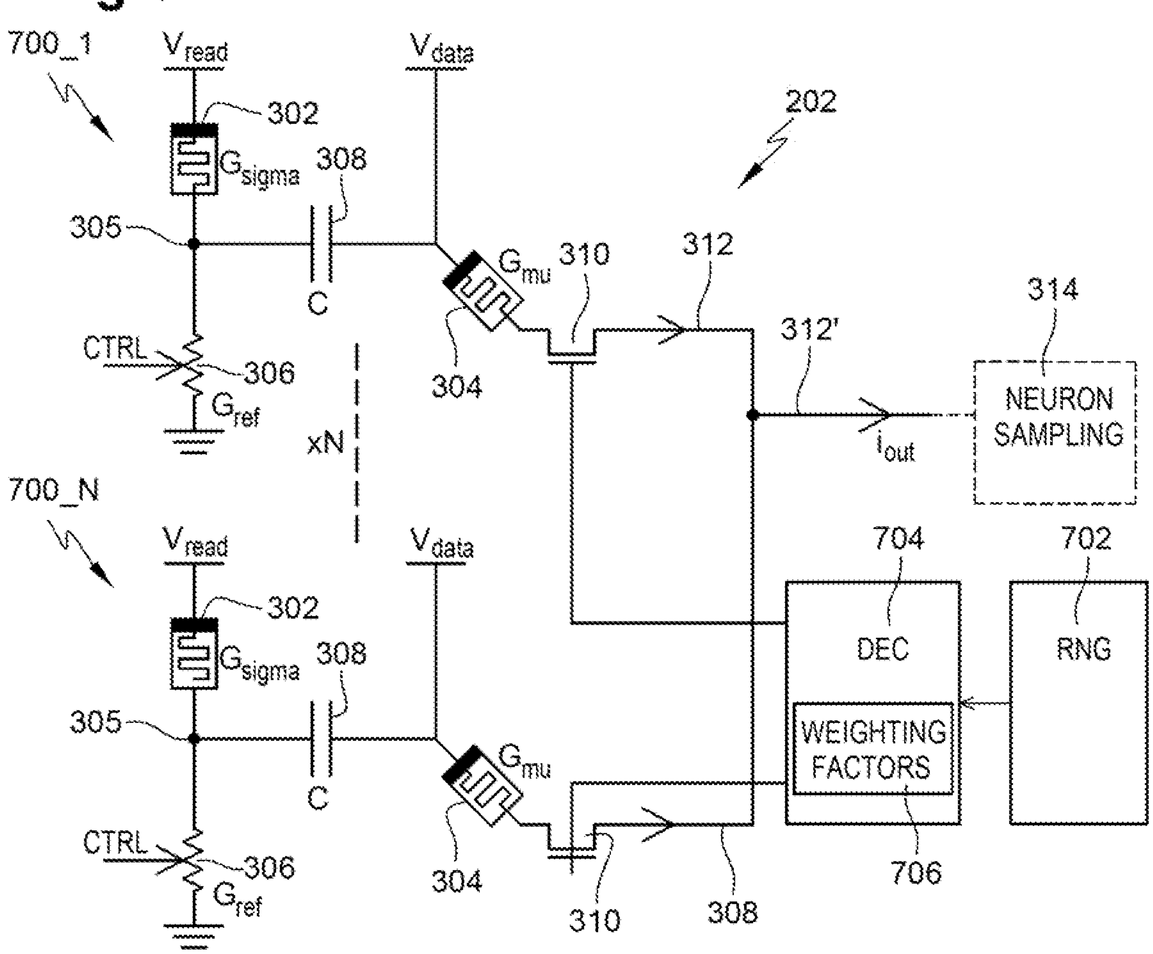
FIG. 7 schematically illustrates a synapse circuit of the memory array of FIG. 2 in more detail according to an alternative embodiment to those of FIGS. 3 and 5, in which the synapse circuit implements a Gaussian mixture synapse.

FIG. 7 schematically illustrates a synapse circuit 202 of the memory array of FIG. 2 in more detail according to an alternative embodiment to those of FIGS. 3 and 5, in which the synapse circuit 202 implements a Gaussian mixture synapse. This embodiment is based on Gaussian mixture model theory, which states that any arbitrary distribution can be approximated through a weighted sum of samples collected from a collection of Gaussian probability distributions. This principle is described in more detail in the publication by D. Reynolds entitled "Gaussian Mixture Models", Encyclopedia of biometrics 741 (2009): 659-663.

In the example of FIG. 7, N synapse sub-circuits 700_1 to 700_N are arranged in parallel, each of these sub-circuits being implemented by a corresponding instantiation of the synapse circuit 202 of FIG. 3. It would alternatively be possible to implement the sub-circuits based on the synapse circuit 202 of FIG. 5. The output lines 312 of the sub-circuits 700_1 to 700_N are for example coupled together to form a single output line 312' of the synapse circuit 202. The synapse circuit 202 of FIG. 5 further comprises, for example, a random number generator (RNG) 702 having its output coupled to a decoder circuit (DEC) 704, the decoder circuit 704 controlling the selection transistors 310 of the N sub-circuits 700_1 to 700_N. The decoder circuit 704 for example stores weighting factors (WEIGHTING FACTORS) 706 associated with each of the probability distributions of the sub-circuits 700_1 to 700_N. In some embodiments, all the weighting factors 706 sum to one. The decoder 704 is for example configured to provide a read signal to the transistor 310 of each sub-circuit 700_1 to 700_N depending on the value generated by the random number generator 702 and on the weighting factors 706. A dedicated random number generator 702 and decoder circuit 704 are for example provided for each synapse circuit 202 (i.e. each cross-point of FIG. 2). In the case of a spiking neuron network, it would however be possible to share the random number generator 702 by multiple synapse circuits 202, as in this case a random number can be generated only upon occurrence of spike, as described for example in the patent filing entitled "Neural network and method for variational inference" sharing the same priority date as the present filing and in the name of the same applicant (EP patent application publication number EP4184391A1).

In operation, the random number generator 702 for example supplies a random value to the decoder circuit 704, which is for example configured to select one of the sub-circuits 700_1 to 700_N to be activated based on the random value. For example, the random value is sampled from a uniform distribution. The range of possible values of the random value is for example divided into sub-ranges, each sub-range being associated with a corresponding one of the sub-circuits 700_1 to 700_N. The size of each sub-range represents the weighting factor of the corresponding sub-circuit, and is for example learned during variational inference. The decoder circuit 704 is for example configured to compare the random value with each of the sub-ranges, and to activate the sub-circuit 700_1 to 700_N that is associated with the sub-range within which the random value falls.

As an example, the random value could be a 5-bit value having any value between 0 and 31. There are for example two sub-circuits 700_1 and 700_2, the sub-circuit 700_1 being associated with a sub-range 0 to 24, and the sub-circuit 700_2 being associated with a sub-range 25 to 31. If the random value falls in the range 0 to 24, the sub-circuit 700_1 is for example activated by the decoder circuit 704, and the output current $i_{out}$ of the synapse circuit 202 is thus provided by this sub-circuit 700_1. If the random value falls in the range 25 to 31, the sub-circuit 700_2 is for example activated by the decoder circuit 704, and the output current $i_{out}$ of the synapse circuit 202 is thus provided by this sub-circuit 700_2.

It should be noted that, during inference, many samples are generally taken of each synaptic weight per prediction, in other words there are multiple forward passes through the neural network. On each pass, a new sub-circuit is selected based on a new random value generated by the generator 702, and in this way each sub-circuit is selected a number of times that is proportional to its learned probability distribution weight, resulting in a Gaussian mixture, as represented in FIG. 8.

Figure 8:
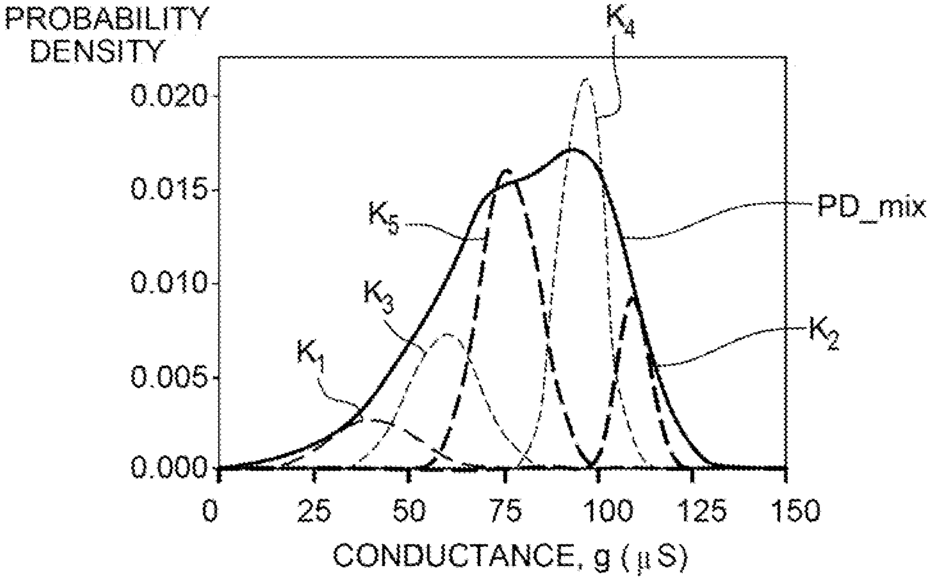
FIG. 8 is a graph illustrating probability densities of the conductance of the synapse circuit of FIG. 7 according to an example embodiment of the present disclosure.

FIG. 8 is a graph illustrating probability density (PROBABILITY DENSITY) of a conductance (CONDUCTANCE, g (μS)) of the synapse circuit 202 of FIG. 7 according to an example embodiment of the present disclosure. Dashed-line curves $K_1$ to $K_5$ in FIG. 8 represent examples of probability densities of five corresponding sub-circuits. A solid curve PD_mix illustrates an example of overall probability distribution that can be obtained by selecting a different one of the sub-circuits over many forward passes through the network.

In the embodiments described with reference to FIGS. 3 to 8, the resistive memory devices 302, 304 are respectively programmed based on learning during variational inference operations. In particular, the conductance $G_{sigma}$ of the device 302 is adjusted to an appropriate level to represent the standard deviation of the probability distribution, and the conductance $G_{mu}$ of the device 304 is adjusted to an appropriate level to represent the mean of the probability distribution. The amounts that the conductances of the devices should by adjusted during the learning phase are for example based on standard back propagation techniques, as described for example in the publication by Blundell, Charles, et al. entitled "Weight uncertainty in neural network" International Conference on Machine Learning. PMLR, 2015, and will not be described herein in detail. Examples of programming operations that can be used to program the conductances of the devices 302, 304 will now be described with reference to FIGS. 9 and 10 to 11.

Figure 9:
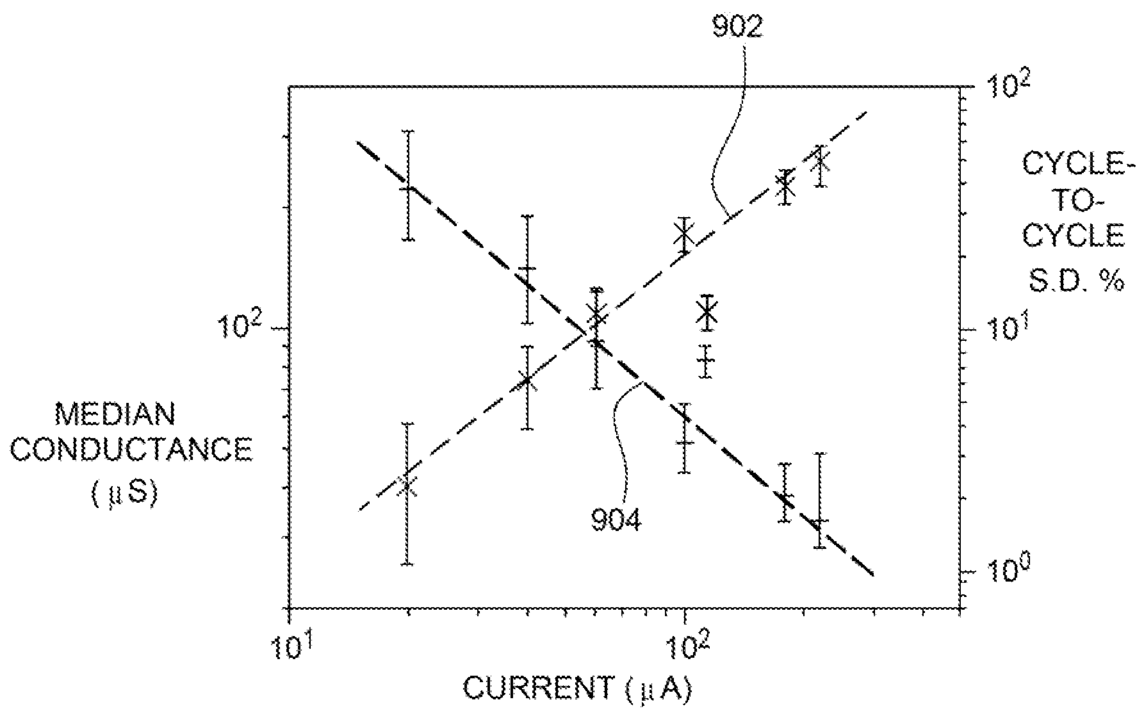
FIG. 9 is a graph illustrating conductance against programming current of an OxRAM device according to an example embodiment.

FIG. 9 is a graph illustrating examples of conductance levels obtained by programming an OxRAM device during a SET operation into the high conductance/low resistance state. In particular, the graph of FIG. 9 represents, for a SET programming current range 11 to 120 μA (CURRENT (μA)), a median conductance (MEDIAN CONDUCTANCE (μS)) represented by a curve 902 with a log scale on the left-hand axis, and a cycle-to-cycle standard deviation (CYCLE-TO-CYCLE S.D. %) of the conductance state following a RESET operation on the OxRAM device, represented by a curve 904 with a log scale on the right-hand axis. While the standard deviation is relatively high (around 70%) for some lower conductances, the precision remains acceptable.

Figure 10:
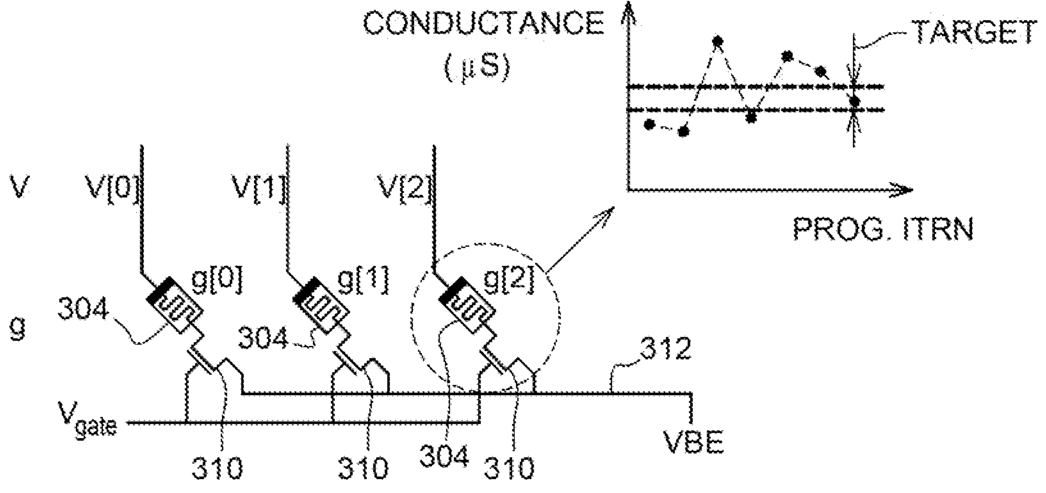
FIG. 10 schematically illustrates iterative programming of a resistive memory device according to an example embodiment.

FIG. 10 schematically illustrates iterative programming of a resistive memory device according to an example embodiment. The example is based on the programming the devices 304 of the synapse circuits 202, for by programming a high conductance state (HCS) using a SET operation.

Three of the devices 304 are shown in the example of FIG. 10. Each device 304 is coupled in series with a programming selection transistor, which is for example the transistor 310 of FIG. 3, or another transistor. The programming selection transistors 310 are for example controlled by a voltage signal $V_{gate}$, which is for example provided by the control circuit 212. For example, the series connection of each device 302 and transistor 310 is coupled between a corresponding programming voltage line V[0], V[1] and V[2] and the output line 312, to which is applied a common bottom electrode voltage rail VBE.

Each device 302 is for example programmed in turn, by applying, for example by the control circuit 212, a programming voltage to the corresponding voltage line V[0], V[1] and V[2], and asserting the voltage signal $V_{gate}$ in order to activate the corresponding conduction path through the device 304 to be programmed. In some embodiments, a sufficiently precise target conductance of the device 304 is not always achieved after a single programming operation. It is therefore possible to apply an iterative programming approach. According to this approach, after the programming operation, a read voltage is for example applied, by the control circuit 212, to the corresponding voltage line V[0], V[1] and V[2], and the resulting current on the line 312 is for example compared, by the control circuit 212, to a desired range in order to determine whether the conductance of the device has reached a desired conductance range, or whether it should be increased or decreased. If it is outside of the range, it is determined what adjustment should be applied to the programming voltage, and then the adjusted programming voltage is for example applied to the device in order to adjust its conductance level. In the case of a PCM device, the adjustment can be applied using a SET or RESET pulse to increase or decrease the conductance. In the case of an OxRAM device, a RESET operation is for example performed first, before then performing a new SET operation with a modified programming voltage. As represented by a graph inset in FIG. 10, this process is for example repeated iteratively during several programming iterations (PROG. ITRN), until the conductance (CONDUCTANCE (μS)) reaches a desired target range.

The devices 302 of each synapse circuit 202 can for example be programmed using a similar technique to the one of FIG. 10. However, the devices 302 are for example programmed to the low conductance state (LCS) using a RESET operation. Rather than the transistors 310, other selection transistors are used, such as the transistors 502 of FIG. 5, and the rather than the common line 312, the selection transistors are coupled to another common line. This operation for example involves applying 0 V to the top electrode of the device 302 to be programmed, and applying a positive voltage to the common line, such that the device sees a negative voltage.

An advantage of the embodiments described herein is that weights respecting given learned probability distributions can be sampled by synapse circuits in a simple and energy efficient manner. Indeed, the currents used to generate the random distribution signals can be relatively low. For example, assuming a voltage $V_{read}$ of 0.4 V, which is for example chosen not to disturb the programmed state of the device 302, but to be high enough so as to saturate the current mirror transistors, that an LCS of 200 Mohms is used, and that the current mirror is also providing a resistance of about 200 Mohms, then by ohms law the current for generating the random distribution signal will be of around 1 nA. This compares to currents of tens or hundreds of microamps in the prior art solutions.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. A synapse circuit for a Bayesian neural network, the synapse circuit comprising:

a first resistive memory device coupling a first voltage rail to a first terminal of a capacitor, the first terminal of the capacitor being coupled to a second voltage rail via a variable conductance; and a second resistive memory device coupling a third voltage rail to a first output line of the synapse circuit, wherein a second terminal of the capacitor is coupled to a terminal of the second resistive memory device.

2. The synapse circuit of claim 1, further comprising a selection switch coupled in series with the second resistive memory device.

3. The synapse circuit of claim 1, wherein the variable conductance comprises a variable resistor.

4. The synapse circuit of claim 1, wherein the variable conductance is a mirroring branch of a current mirror.

5. The synapse circuit of claim 1, further comprising a current control circuit configured to regulate a biasing current conducted by the variable conductance.

6. The synapse circuit of claim 1, wherein the first and second resistive memory devices are each capable of being programmed to have one of a low conductance state and a high conductance state, and the first resistive memory device is programmed to have a low conductance state, and the second resistive memory device is programmed to have a high conductance state.

7. The synapse circuit of claim 1, wherein the first and second resistive memory devices are oxide-based resistive random access memory devices.

8. The synapse circuit of claim 2, wherein the synapse circuit is a Gaussian mixture synapse, wherein the first and second resistive memory devices, capacitor variable conductance and selection switch form a first sub-circuit, the synapse circuit further comprising:

at least one further sub-circuit comprising a first further resistive memory device coupling the first voltage rail to a first terminal of a further capacitor, the first terminal of the further capacitor being coupled to the second voltage rail via a further variable conductance; a second further resistive memory device coupling the third voltage rail to an output line of the at least one further sub-circuit, wherein a second terminal of the further capacitor is coupled to a terminal of the second further resistive memory device; and a further selection switch coupled in series with the second further resistive memory device, wherein the first output line and the output line of the at least one further sub-circuit are coupled to a common output line of the Gaussian mixture synapse; and a selection circuit configured to control the selection switch of each sub-circuit.

9. The synapse circuit of claim 8, wherein the selection circuit comprises a random number generator, and a decoder circuit configured to control the selection switch of each sub-circuit based on a random value generated by the random number generator.

10. A cross-point memory array comprising a plurality of the synapse circuit of claim 1, one of said plurality of the synapse circuit being positioned at each point of the cross-point memory array, the cross-point memory array implementing a synaptic weight matrix between layers of the Bayesian neural network.

11. A method of generating a current signal on an output line of a synapse circuit of a Bayesian neural network, the method comprising:

programming a first resistive memory device of the synapse circuit to have a first conductance level, the first resistive memory device coupling a first voltage rail to a first terminal of a capacitor, the first terminal of the capacitor being coupled to a second voltage rail via a variable conductance;

programming a second resistive memory device to have a second conductance level, the second resistive memory device coupling a third voltage rail to the output line of the synapse circuit, wherein a second terminal of the capacitor is coupled to a terminal of the second resistive memory device; and applying a voltage to the first voltage rail in order to generate a current signal on the output line.

12. The method of claim 11, further comprising sampling the current signal to generate the current signal on the output line.

13. The method of claim 11, wherein the synapse circuit further comprises a selection switch coupled in series with the second resistive memory device, the method further comprising activating the selection switch while applying the voltage to the first voltage rail in order to generate the current signal on the output line.

* * * * *